(12) United States Patent
Gupta et al.

(10) Patent No.: US 8,195,588 B2
(45) Date of Patent: Jun. 5, 2012

(54) SYSTEM AND METHOD FOR TRAINING A CRITICAL E-MAIL CLASSIFIER USING A PLURALITY OF BASE CLASSIFIERS AND N-GRAMS

(75) Inventors: Narendra Gupta, Dayton, NJ (US); Mazin Gilbert, Warren, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 879 days.

(21) Appl. No.: 12/080,443

(22) Filed: Apr. 3, 2008

(65) Prior Publication Data

US 2009/0254498 A1    Oct. 8, 2009

(51) Int. Cl.
*G06Q 20/00* (2012.01)
(52) U.S. Cl. ........................................... 706/20
(58) Field of Classification Search ............... 706/12, 706/20, 45–48
See application file for complete search history.

(56) References Cited

U.S. PATENT DOCUMENTS

| | | | |
|---|---|---|---|
| 2001/0044729 A1 | 11/2001 | Pomerance | |
| 2002/0010591 A1 | 1/2002 | Pomerance | |
| 2002/0038307 A1* | 3/2002 | Obradovic et al. | 707/102 |
| 2004/0111253 A1* | 6/2004 | Luo et al. | 704/4 |
| 2005/0210065 A1* | 9/2005 | Nigam et al. | 707/104.1 |
| 2007/0094061 A1* | 4/2007 | Hu et al. | 705/8 |
| 2007/0183655 A1* | 8/2007 | Konig et al. | 382/159 |
| 2008/0146895 A1* | 6/2008 | Olson et al. | 600/301 |
| 2008/0147574 A1* | 6/2008 | Chidlovskii | 706/12 |
| 2009/0063145 A1* | 3/2009 | Hakkani-Tur et al. | 704/244 |

OTHER PUBLICATIONS

Yang et al., A Study on Retrospecitve and On-line Event Detection,1998, ACM 1-58113-01505, pp. 28-36.*
Freund et al., A Short Introduction to Boosting, Sep. 1999, Journal of Japanese Society for Artificial Intelligence, 14(5) pp. 1-14.*
Litman, D., et al., "Predicting Student Emotions in Computer-Human Tutoring Dialogues", Proceedings of the 42nd Annual Meeting of the ACL, Barcelone, Spain, 2004.

* cited by examiner

*Primary Examiner* — David Vincent

(57) ABSTRACT

Disclosed is a method and system for identifying critical emails. To identify critical emails, a critical email classifier is trained from training data comprising labeled emails. The classifier extracts N-grams from the training data and identifies N-gram features from the extracted N-grams. The classifier also extracts salient features from the training data. The classifier is trained based on the identified N-gram features and the salient features so that the classifier can classify unlabeled emails as critical emails or non-critical emails.

5 Claims, 5 Drawing Sheets

FIG. 2

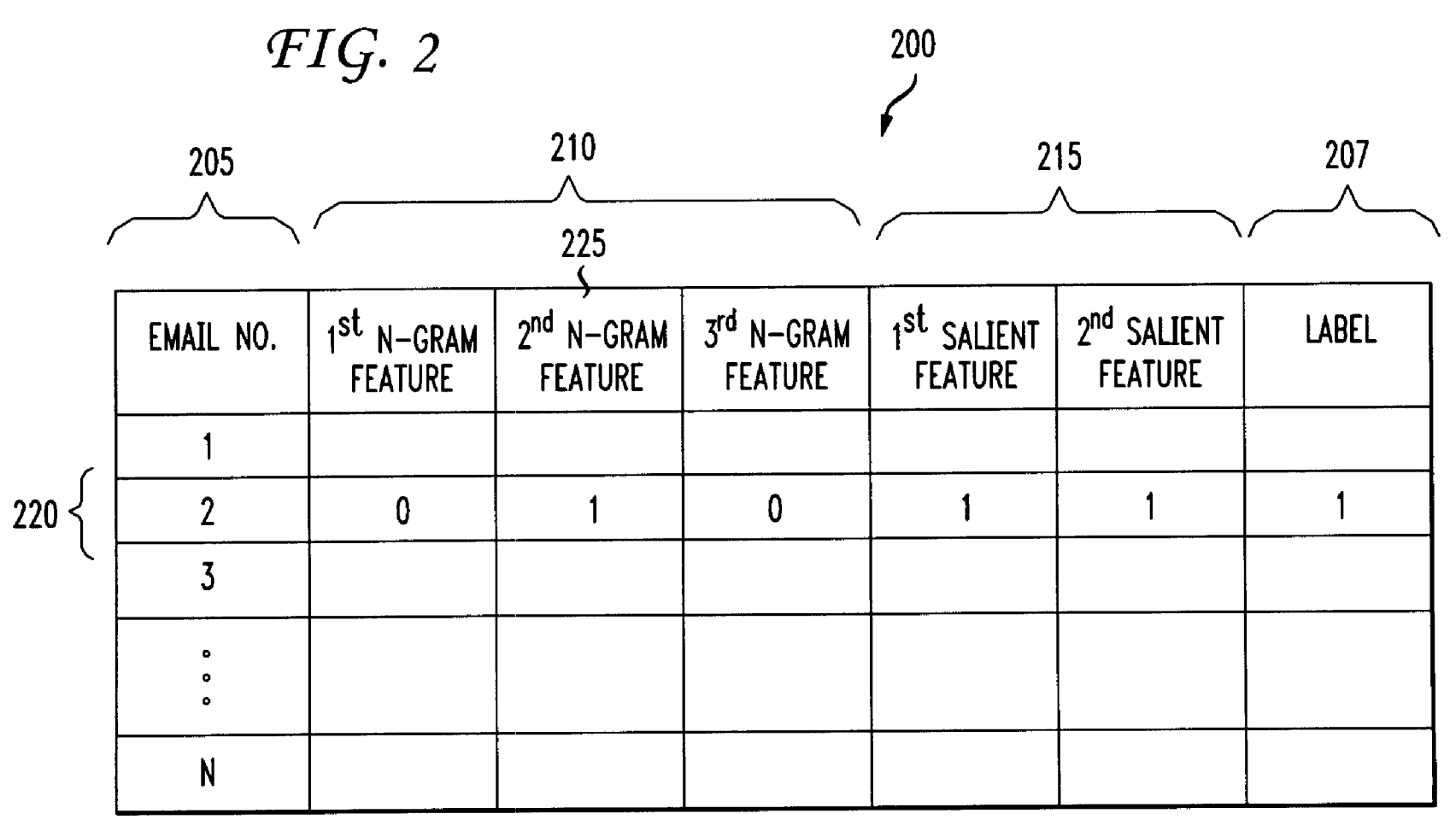

| EMAIL NO. | 1st N-GRAM FEATURE | 2nd N-GRAM FEATURE | 3rd N-GRAM FEATURE | 1st SALIENT FEATURE | 2nd SALIENT FEATURE | LABEL |
|---|---|---|---|---|---|---|
| 1 | | | | | | |
| 2 | 0 | 1 | 0 | 1 | 1 | 1 |
| 3 | | | | | | |
| ... | | | | | | |
| N | | | | | | |

SYSTEM AND METHOD FOR TRAINING A CRITICAL E-MAIL CLASSIFIER USING A PLURALITY OF BASE CLASSIFIERS AND N-GRAMS

BACKGROUND OF THE INVENTION

The present invention is generally directed to email, and more particularly to identifying critical emails.

Emails are becoming a preferred communication channel for customer service. For customers, it is a way to avoid long hold times on voice channels and to document the exchange. For companies, it offers an opportunity to best utilize customer service representatives by evenly distributing the workload over time, and, for representatives, it allows time to research the issue and respond to the customers in a manner consistent with company policies. Companies can further exploit the offline nature of emails by automatically routing the emails involving special issues to representatives trained in dealing with such issues.

Besides specialized product and service related issues, every business must ensure emails containing an emotional component, such as language expressing anger, sadness, disappointment, etc., are handled with care. Such emails are critical for businesses. Their careful handling helps customer retention, i.e., retaining customers who otherwise would have taken their business elsewhere. Furthermore, critical emails provide valuable feedback for business process improvement.

To detect critical emails, a critical email detector is typically constructed. An approach to building a critical email detector is to train a statistical classifier to generate a model. The statistical classifier can then use the model to analyze the text of emails and classify each email as critical or not critical. For such an approach, a significant amount of expensive training data is typically needed to generate a reliable model. To create training data, a large number of customer emails are analyzed by human labelers and labeled as critical or not. Furthermore, to train an accurate classifier, however, it is important to have as little noise in the labeling of training data as possible. This requires a very high level of agreement among human labelers. Given the subjective nature of the task, however, a high level of agreement among labelers is often difficult to obtain. Some labelers may consider an email to be critical while others may not.

As a result, there remains a need for a more accurate way to identify critical emails.

BRIEF SUMMARY OF THE INVENTION

To identify critical emails, a critical email classifier is trained from training data comprising labeled emails. The classifier extracts N-grams from the training data and identifies N-gram features from the extracted N-grams. The classifier also extracts additional features (called salient features herein) from the training data. The classifier is trained based on the identified N-gram features and the salient features so that the classifier can classify unlabeled emails as critical emails or non-critical emails.

Human knowledge about what makes an email critical is utilized to guide the labelers so that higher levels of agreement among the labelers is obtained. At the same time, this reduces the need for a large volume of expensive training data and instead enables the training of more reliable models from significantly less amount of training data. Besides the use of word N-gram features typically used by text classifiers, salient features are used. These salient features are extracted from the body of the email text. In one embodiment, the salient features are based on human knowledge as to what makes an email critical. One or more salient features may be received as user input and then used on future emails (e.g., extracted from future emails). A statistical classifier is trained using the classifier model thus generated to classify incoming customer emails as critical emails or non-critical emails.

Training the critical email classifier can include generating a model. The model can then be used by the classifier to classify unlabeled emails. In one embodiment, the classifier classifies unlabeled emails by extracting N-grams from the unlabeled emails, identifying the N-gram features from the extracted N-grams, extracting salient features from the unlabeled emails, and classifying the unlabeled emails based on the N-gram features and the salient features using the model.

These and other advantages of the invention will be apparent to those of ordinary skill in the art by reference to the following detailed description and the accompanying drawings.

BRIEF DESCRIPTION OF THE DRAWINGS

FIG. 2 shows a table having N-gram feature columns, salient feature columns, and a label column in accordance with an embodiment of the present invention;

DETAILED DESCRIPTION

Figure 1:
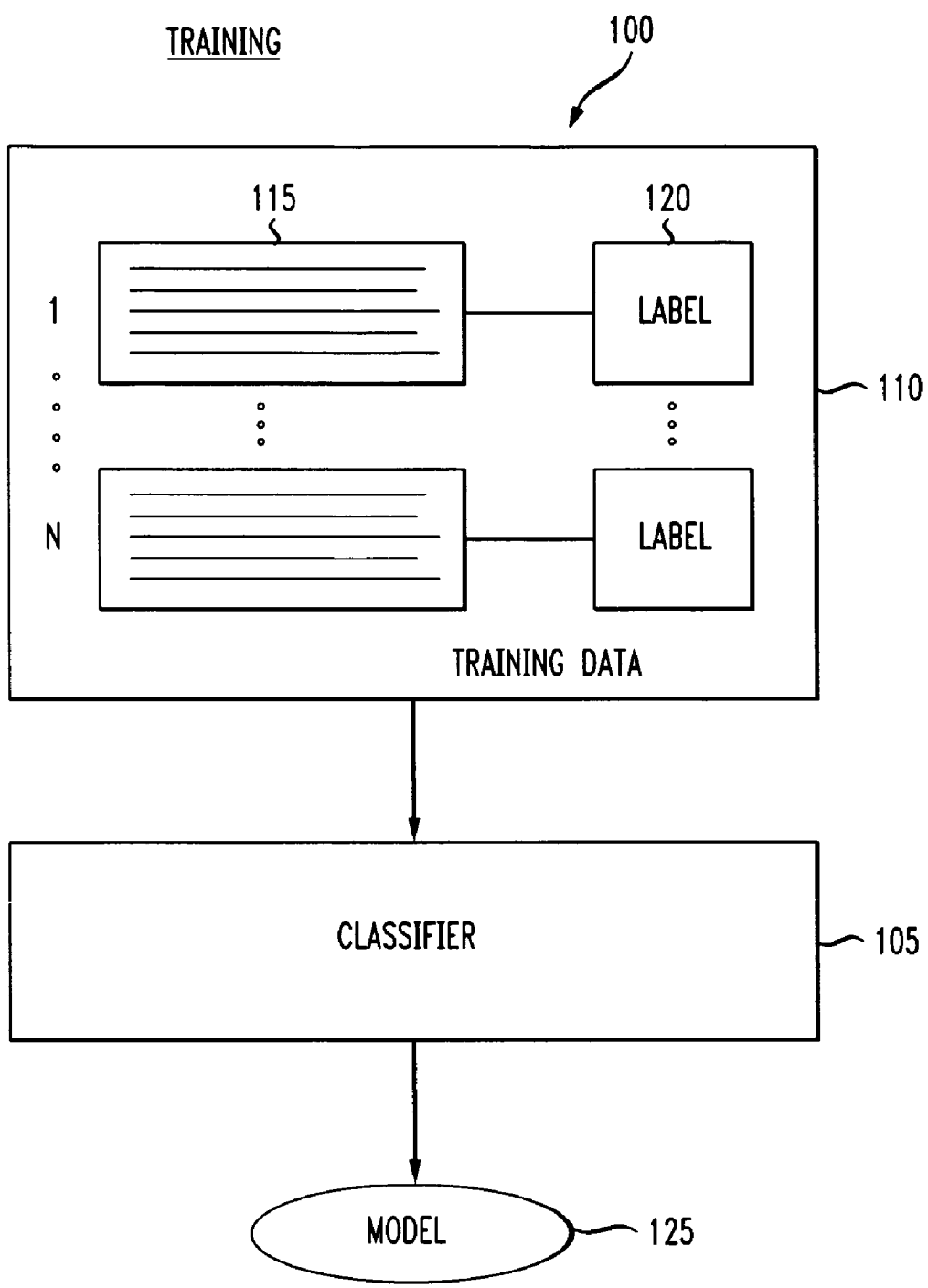
FIG. 1 is a block diagram of a classifier using training data to generate a model in accordance with an embodiment of the present invention.

FIG. 1 shows a block diagram of a system 100 having a critical email classifier 105 used to classify or label emails as critical emails. Training data 110 includes a plurality of emails (i.e., 1 . . . N emails), such as email 115. Each of the emails is assigned a label, such as label 120 assigned to email 115. The label 120 may be a label indicating that an email 115 is a critical email or may be a label indicating that the email is a non-critical email.

In one embodiment, a human labeler analyzes each email in the training data 110 and assigns a label to the email. The human labelers typically assign a label to an email in the training data 110 according to a labeling guide. In one embodiment, the labeling guide includes a description of salient features, such as "expressions of negative opinion about the company" and "threats to take a legal action against the company" along with examples of phrases used to express such features. The labelers are expected to spot such features and assess their seriousness to label emails as critical or not. By including descriptions of salient features based on our knowledge of critical emails in the labeling guide, we have increased the labelers agreement significantly, thereby reducing the noise in the training data.

The labeled emails (i.e., the training data 110) are then transmitted to the classifier 105. The classifier 105 uses the training data 110 to generate a model 125 that can be used to classify emails not previously labeled (e.g., emails received in real-time).

FIG. 2 shows a table 200 utilized by the classifier 105 to generate model 125. The table includes an email identification column 205 identifying each email in the training data 110 (i.e., emails 1 ... N). The table 200 also includes a label column 207 that is utilized by the human labeler(s). In one embodiment, human labeler(s) assign a label to the label column 207 for each email identified in the email identification column 205 based on a labeling guide. Thus, the table 200 initially has column 205 and column 207 utilized for training data 110.

As described above, human labelers may disagree about which emails to label as critical emails and which emails to label as non-critical emails. Specifically, one labeler may consider the presence of a particular word or words to warrant labeling the email as a critical email while another labeler may label the same email as a non-critical email unless there are additional words present. In one embodiment of this invention, such disagreements are significantly reduced by providing the description of the salient features of critical emails.

In one embodiment, the classifier 105 extracts N-grams from each email in the training data 110 and identifies, for each N-gram, whether it is an N-gram feature. An N-gram is a number, N, of words adjacent to one another. For example, to determine a 3-gram (i.e., a trigram) from text such as text found in an email, a sliding window viewing three words at a time can be positioned over each sentence in the text. An example of a trigram is "I am upset" or "How are you?" The three words viewed in the sliding window are extracted from the rest of the text and analyzed to determine whether the three words are considered an N-gram feature. An N-gram is identified as an N-gram feature if the N-gram appears in a particular text (e.g., the emails 115 of the training data 110) more than a predetermined number of times (e.g., ten times). After, for example, three words are extracted from the email, the sliding window moves over one word and a new group of three words in the window are extracted and analyzed until all of the words in the email are extracted and analyzed.

For each N-gram feature, the classifier 105 adds an N-gram feature column 210 to the table 200 and labels the N-gram feature as being present in emails that have the particular N-gram associated with the N-gram feature. After analysis of the N-gram features in the training data 110, the classifier 105 has determined which emails in column 205 have which N-gram features present in columns 210.

In accordance with an embodiment of the present invention, salient features are also used by the classifier 105 to generate the model 125.

In one embodiment, based on our knowledge as to what makes an email critical, we use eight salient features of an email. These are:

1. Expression of negative emotions: e.g., it upsets me, I am frustrated.
2. Expression of negative opinions about the company: e.g., dishonest dealings, disrespectful.
3. Threats to take their business elsewhere: e.g., business elsewhere, look for another provider.
4. Threats to report to authorities: e.g., federal agencies, consumer protection.
5. Threats to take legal action: e.g., seek retribution, lawsuit.
6. Justification as to why they should have been treated better. A common way to do this is to say things like long time customer, loyal customer, etc.
7. Disassociate themselves from the company, by using phrases like: you people, your service representative, etc.
8. State what was done wrong to them: e.g., grossly overcharged, on hold for hours, etc.

For each of these salient features, we also create a list of phrases used to express them. Some examples of such phrases are given above with the description of the salient feature. These individual list of phrases can be manually created by using our knowledge and can be automatically enriched by using automated algorithms based on the idea of collocation of similarly meaning phrases in similar context.

Using these eight lists of phrases (one corresponding to each salient feature), salient features are extracted from an email. More specifically, if any of the phrases corresponding to a salient feature is present in the text of the email, then the salient feature is assumed to be present in that email.

The classifier 105 determines the salient features present in each email of the training data 110 and utilizes columns 215 appropriately for each email identified in column 205. After the table 200 is completely utilized by the classifier 105, the classifier 105 can generate model 125 based on whether an email identified in column 205 has been labeled as critical or non-critical in column 207 and further based on the salient features present (identified in columns 215) and the N-gram features present (identified in columns 210).

Row 220 shows an example row of column 200 for email #2. In one embodiment, the fields of the table 200 are binary. Email #2 has been labeled as a critical email, as indicated by the "1" in column 207 for email #2. Email #2 does not have the first N-gram feature or the third N-gram feature (as indicated by zeros) but does include the second N-gram feature, as indicated by the "1" in column 225. Further, email #2 has both salient features, as indicated by the "1" in columns 215. The classifier 105 may use this combination of N-gram features and salient features (i.e., an email having the $2^{nd}$ N-gram feature along with both salient features) with the labeling of the email as a critical email during the construction of model 125.

Figure 3:
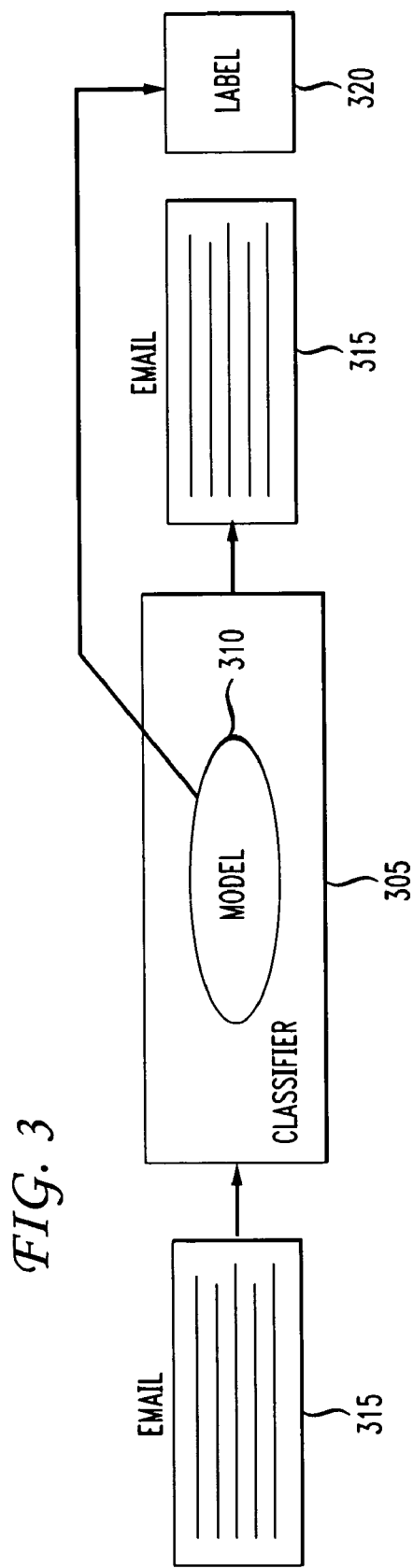
FIG. 3 is a block diagram of a classifier using a model to label emails in accordance with an embodiment of the present invention.

After the training of the classifier 105 is completed, the classifier uses model 125 to label unlabeled emails. FIG. 3 shows a block diagram of a classifier 305 using model 310 to classify emails received in real-time, such as email 315. The classifier 305 receives email 315 and uses model 310 (generated in the training phase as shown in FIG. 1) to automatically assign a label 320 to email 315. Specifically, the classifier 305 may generate a table such as table 200 for unlabeled emails such as email 315 in order to label the emails. The classifier 305 determines whether email 315 includes the N-gram features and salient features that were used for the training data 110. The classifier 305 uses the model 310 to determine whether to label the email 315 as a critical email or a non-critical email.

Figure 4:
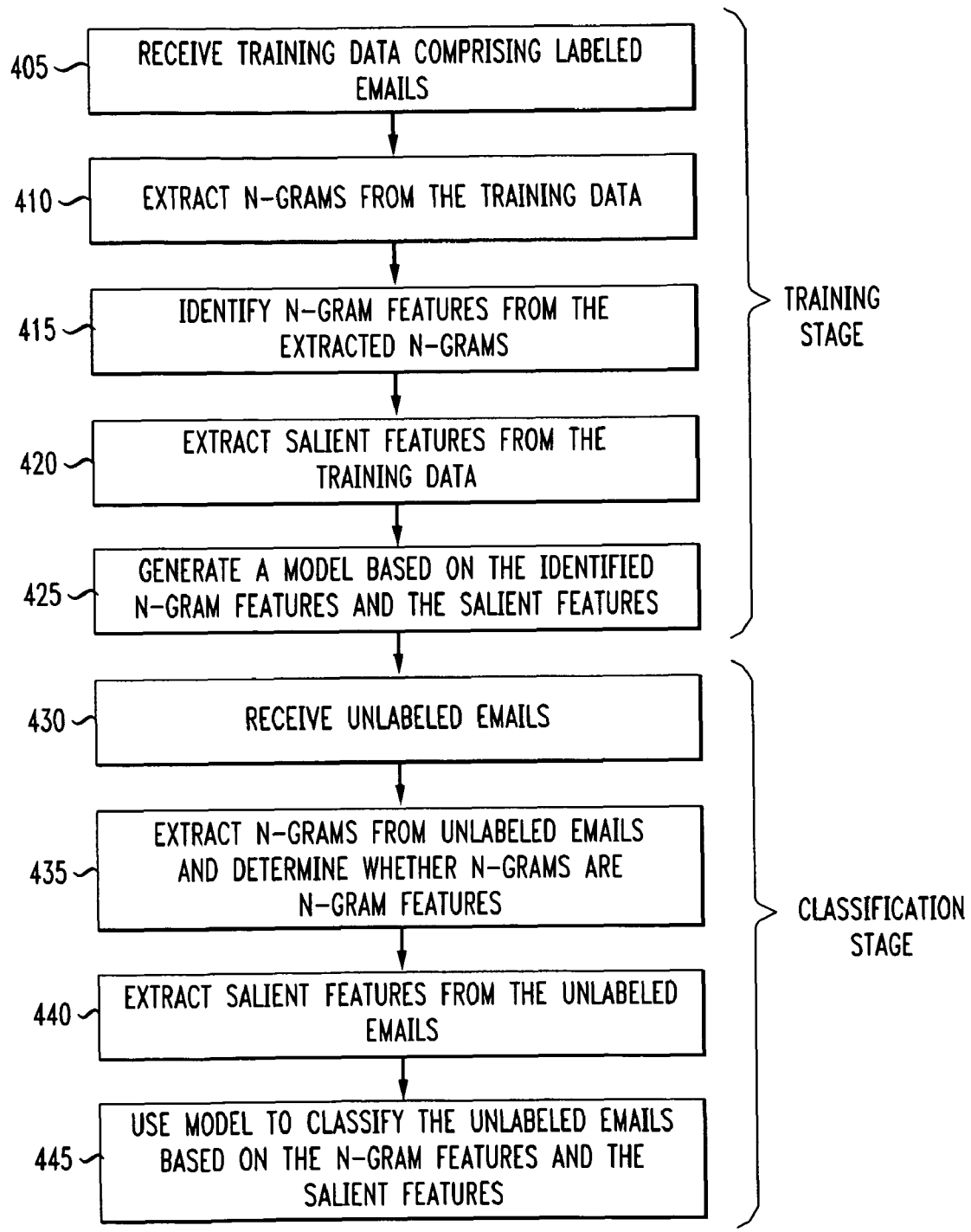
FIG. 4 is a flowchart illustrating the steps performed by the classifier to label emails as critical emails in accordance with an embodiment of the present invention.

FIG. 4 shows a flowchart illustrating the steps performed by the classifier 105 in accordance with an embodiment of the present invention. As described above, the classifier 105 performs a training stage to generate a model 125 and then uses the generated model 125 to classify unlabeled emails in a classification stage.

The classifier 105 receives training data 110 in step 405. The training data 110 includes labeled emails. In one embodiment, the emails are labeled by the human labelers based on salient features (e.g., designated in the labeling guide). If an email has a predetermined number of salient features, the human labelers labels the email as a critical email. The classifier 105 extracts N-grams from the training data (i.e., from the labeled emails) in step 410. In step 415, the classifier 105 identifies N-gram features from the extracted N-grams. The classifier 105 also extracts salient features from the training data in step 420. A model is then generated in step 425. The model is based on the identified N-gram features and the extracted salient features. Steps 405-425 form the training stage.

Once a model 125 has been generated, the classifier 105 uses the model 125 to label received emails. In particular, the classifier 105 receives, in step 430, unlabeled emails. The classifier 105 extracts N-grams from the unlabeled emails and determines whether the extracted N-grams are N-gram features (identified in the training stage) in step 435. The classifier 105 also extracts, in step 440, salient features from the unlabeled emails. The classifier 105 then uses the model 125 to classify the unlabeled emails based on the N-gram features and the salient features. Steps 430-445 form the classification stage.

In one embodiment, a "Boostexter" algorithm is used in steps 425 and 445. A Boostexter algorithm employs boosting, which is building a classifier by combining many "weak" base classifiers, each one of which may only be moderately accurate. Boosting may construct the collection of base classifiers iteratively. On each iteration t, the boosting algorithm supplies a base learner weighted training data and the base learner generates a base classifier $h_t$. A set of nonnegative weights $w_t$ encode how important it is that $h_t$ correctly classifies each email. Generally, emails that were most often misclassified by the preceding base classifiers will be given the most weight so as to force the base learner to focus on the "hardest" examples.

In one embodiment, Boostexter uses confidence rated base classifiers h that for every example x (the customer emails) output a real number h(x) whose sign (−1 or +1) is interpreted as a prediction (+1 indicates an email having an emotional component) and whose magnitude |h(x)| is a measure of "confidence." The output of the final classifier f is $$f(x) = \sum_{t=1}^{T} h_t(x),$$

i.e., the sum of confidence of all classifiers $h_t$. The real-valued predictions of the final classifier f can be converted into probabilities by a logistic function:

$$prob(x = \text{email having an emotional component}) = \frac{1}{1+e^{-f(x)}}.$$

Learning procedure in boosting minimizes the negative conditional log likelihood of the training data under this model, namely:

$$\sum_i \ln(1+e^{-y_i f(x_i)}).$$

Here, i iterates over all training examples and $y_i$ is the label of ith example.

Any other statistical classifier technique can also be used to train the classifier models, such as support vector machine (SVM) technology, adaboost, maximum entropy, etc.

Figure 5:
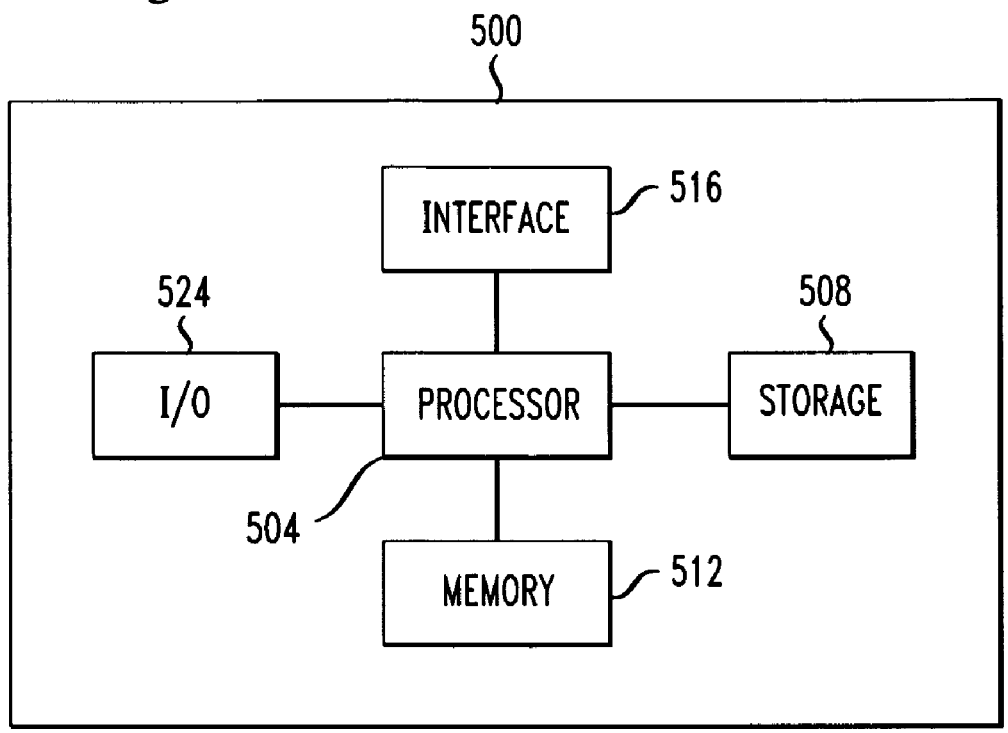
FIG. 5 is a high level block diagram of a computer in accordance with an embodiment of the present invention.

FIG. 5 shows a high level block diagram of a computer 500 which may be used to implement the classifier. The computer 500 can, for example, perform the steps described above (e.g., with respect to FIG. 4). Computer 500 contains a processor 504 which controls the overall operation of the computer by executing computer program instructions which define such operation. The computer program instructions may be stored in a storage device 508 (e.g., magnetic disk, database) and loaded into memory 512 when execution of the computer program instructions is desired. Thus, the computer operation will be defined by computer program instructions stored in memory 512 and/or storage 508 and the computer will be controlled by processor 504 executing the computer program instructions. Computer 500 also includes one or more interfaces 516 for communicating with other devices. Computer 500 also includes input/output 524 which represents devices which allow for user interaction with the computer 500 (e.g., display, keyboard, mouse, speakers, buttons, etc.). One skilled in the art will recognize that an implementation of an actual computer will contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
   receiving training data comprising labeled emails, the labeled emails labeled based on user input salient features selected from a plurality of salient features describing email content;
   extracting labeled email N-grams from the training data at a critical email classifier comprising a processor;
   identifying labeled email N-gram features from the labeled email N-grams;
   extracting labeled email salient features from the training data;
   training the critical email classifier based on the labeled email N-gram features and the labeled email salient features, the training comprising generating a model having a base classifier and a nonnegative weight associated with the base classifier, the nonnegative weight based on a number of misclassifications by preceding base classifiers; and
   classifying unlabeled emails at the critical email classifier using the model, the classifying comprising:
      extracting unlabeled email N-grams from the unlabeled emails;
      determining that a particular unlabeled email N-gram is an unlabeled email N-gram feature;
      extracting unlabeled email salient features from the unlabeled emails; and
      classifying the unlabeled emails based on the unlabeled email N-gram feature and the unlabeled email salient features.

2. A method comprising:
   extracting unlabeled email N-grams from each of a plurality of unlabeled emails at a critical email classifier comprising a processor;
   determining that a particular unlabeled email N-gram is an unlabeled email N-gram feature;

extracting unlabeled email salient features from the each of the plurality of unlabeled emails; and classifying each of the plurality of unlabeled emails based on the unlabeled email N-gram feature and the unlabeled email salient features using a model having a base classifier and a nonnegative weight associated with the base classifier, the nonnegative weight based on a number of misclassifications by preceding base classifiers, wherein the model is generated using a method comprising:

receiving training data comprising labeled emails at the critical email classifier, the labeled emails labeled based on user input salient features selected from a plurality of salient features describing email content;

extracting labeled email N-grams from the training data;

identifying labeled email N-gram features from the labeled email N-grams;

extracting labeled email salient features from the training data; and generating the model based on the labeled email N-gram features and the labeled email salient features.

3. A critical email classifier comprising:

means for receiving training data comprising labeled emails, the labeled emails labeled based on user input salient features selected from a plurality of salient features describing email content;

means for extracting labeled email N-grams from the training data;

means for identifying labeled email N-gram features from the labeled email N-grams;

means for extracting labeled email salient features from the training data;

means for training the critical email classifier based on the labeled email N-gram features and the labeled email salient features, the means for training comprising means for generating a model having a base classifier and a nonnegative weight associated with the base classifier, the nonnegative weight based on a number of misclassifications by preceding base classifiers; and means for classifying unlabeled emails using the critical email classifier, the means comprising:

means for extracting unlabeled email N-grams from the unlabeled emails;

means for determining that a particular unlabeled email N-gram is an unlabeled email N-gram feature;

means for extracting unlabeled email salient features from the unlabeled emails; and means for classifying the unlabeled emails based on the unlabeled email N-gram feature and the unlabeled email salient features.

4. An apparatus comprising:

means for extracting unlabeled email N-grams from each of a plurality of unlabeled emails;

means for determining that a particular unlabeled email N-gram is an unlabeled email N-gram feature;

means for extracting unlabeled email salient features from the each of the plurality of unlabeled emails;

means for classifying each of the plurality of unlabeled emails based on the unlabeled email N-gram feature and the unlabeled email salient features using a model having a base classifier and a nonnegative weight associated with the base classifier, the nonnegative weight based on a number of misclassifications by preceding base classifiers; and means for generating the model comprising:

means for receiving training data comprising labeled emails, the labeled emails labeled based on user input salient features selected from a plurality of salient features describing email content;

means for extracting labeled email N-grams from the training data;

means for identifying labeled email N-gram features from the labeled email N-grams;

means for extracting labeled email salient features from the training data; and means for generating the model based on the labeled email N-gram features and the labeled email salient features.

5. A computer readable medium storing computer program instructions for a critical email classifier, which, when executed on a processor, cause the processor to perform a method comprising:

receiving training data comprising labeled emails, the labeled emails labeled based on user input salient features selected from a plurality of salient features describing email content;

extracting labeled email N-grams from the training data at a critical email classifier comprising a processor;

identifying labeled email N-gram features from the labeled email N-grams;

extracting labeled email salient features from the training data;

training the critical email classifier based on the labeled email N-gram features and the labeled email salient features, the training comprising generating a model having a base classifier and a nonnegative weight associated with the base classifier, the nonnegative weight based on a number of misclassifications by preceding base classifiers; and classifying unlabeled emails at the critical email classifier using the model, the classifying comprising:

extracting unlabeled email N-grams from the unlabeled emails;

determining that a particular unlabeled email N-gram is an unlabeled email N-gram feature;

extracting unlabeled email salient features from the unlabeled emails; and classifying the unlabeled emails based on the unlabeled email N-gram feature and the unlabeled email salient features.

\* \* \* \* \*